United States Patent Office 3,461,913
Patented Aug. 19, 1969

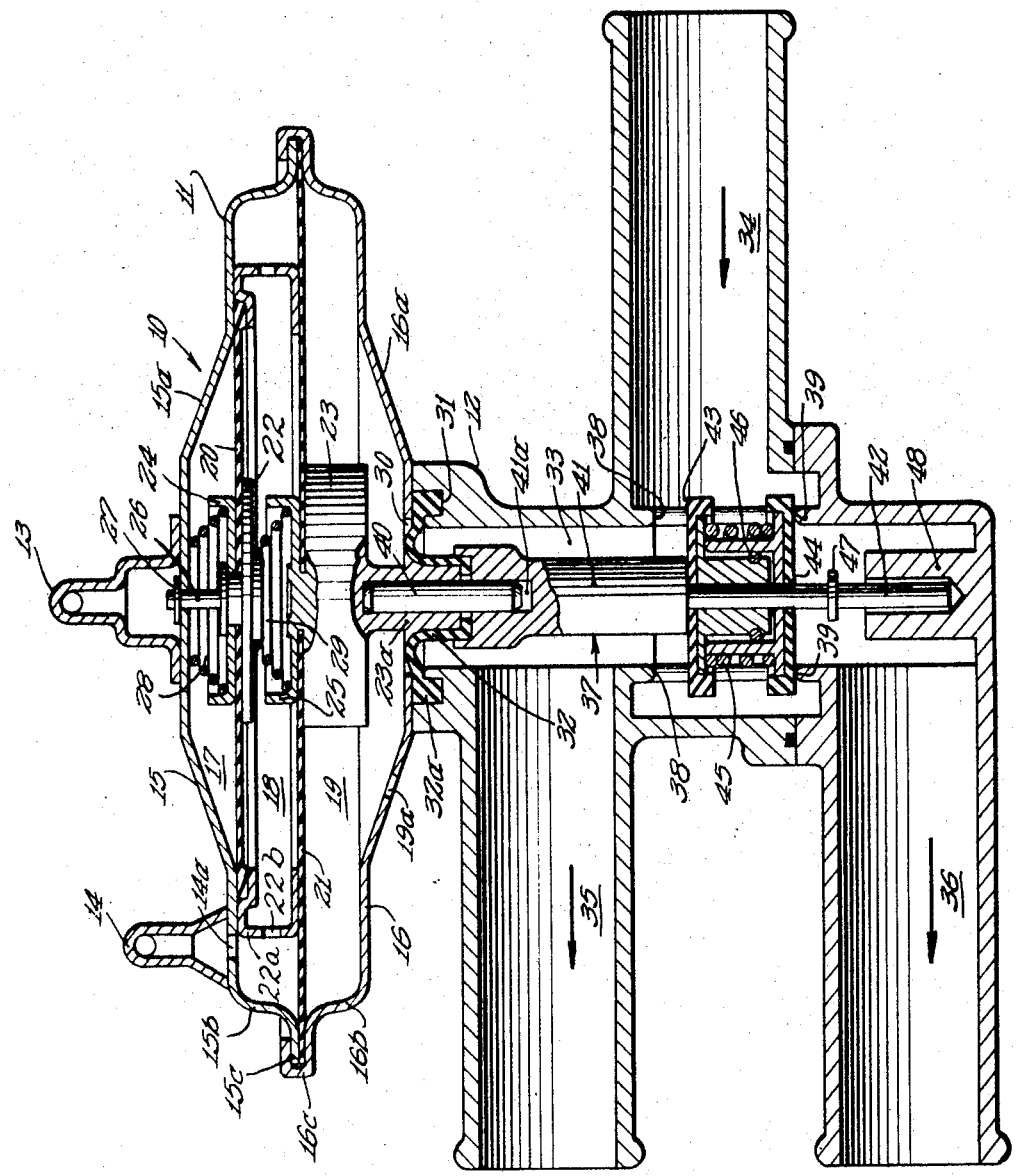

3,461,913
CAR HEATER VALVE
Arthur A. Scott, Chicago, Ill., assignor to The Dole Valve
Company, Morton Grove, Ill., a corporation of Illinois
Filed Aug. 31, 1966, Ser. No. 576,448
Int. Cl. F16k 11/02, 31/12
U.S. Cl. 137—627.5                               8 Claims

ABSTRACT OF THE DISCLOSURE

A multi-positioned unitary valve assembly controlling flow in a two-inlet device having a vacuum-mechanical actuator comprising two vacuum chambers each having a diaphragm and biased spring and an atmospheric chamber acting on one of the vacuum chambers. A valve assembly is interconnected with the actuator by a rod member that carries a two-faced valve means with a biased spring between the faces. The valve assembly is actuted by a balance of vacuum pressure and mechanical pressure.

---

This invention relates generally to a car heater valve assembly and more patricularly to a multi-positioned vacuum valve controlling flow of fluid in a heater core of a blend-air heater system of a passenger compartment in an automobile.

Adequate temperature control in an automobile, during the course of normal operation throughout the various seasons, requires addition of heat and/or coolant in order to maintain a comfortable temperature range for the passengers of the automobile. A substantial portion of automobiles presently manufactured now include airconditioning systems to positively maintain a comfortable temperature during the various seasons.

Generally, such automobiles have been equipped with two separate and distinct heater valve assemblies, one for the supply of heat during the winter months and one for the supply of coolant during the summer months. As will be appreciated, such systems have many disadvantages, among these being the necessity for coordinating the respective valve assemblies with each other and with their own respective control units, the unwieldiness of the overall assembly, the uneconomical manufacturing and assembling costs, etc. However, the desirability of providing positive cooling and heating means in automobiles remains, and accordingly, this invention provides a single unit valve assembly fully controlling flow to a heater core actuating heating and cooling system in an automobile. The present invention also provides a compact, inexpensive valve and actuating unit which is simple in design and assembly, and is economical to manufacture.

Accordingly, it is an object of the present invention to provide a single unit car heater vacuum valve assembly controlling flow of fluid to heating and cooling means in an automobile temperature control system.

It is another object of the present invention to provide a single unit car heater vacum valve assembly that is compact and responsive to a single control unit.

It is a further object of the present invention to provide a valve actuating unit that has a multi-positioned operating state.

It is an additional object of the present invention to provide a valve actuating unit operative on relatively slight vacuum.

It is yet another object of the present invention to provide a double outlet single inlet car heater valve assembly that is vacuum actuated.

It is also an object of the invention to provide a car heater valve assembly that permits two outlets to be closed and selectively opened feeding a two-inlet car heater core with a minimum of valve stem motion.

It is another object of the present invention to provide a car heater valve actuator assembly that is simple in design and assembly, and is economical to manufacture.

These and other objects, features and advantages of the present invention will be understood in greater detail from the following description and associated drawings wherein reference numerals are utilized to designate a preferred embodiment and where the figure illustrated is a cross-esctional view of a valve actuator assembly constructed in accordance with the principles of this invention, and shown at the maximum heat position.

Referring more particularly to the attached drawing, which illustrates a preferred embodiment of the invention, a valve actuator housing 10 is shown as having an actuator section 11 and a valve section 12. The actuator is operated by a vacuum supply (not shown) which originates at the intake manifold of a combustion type engine and is stored in a vacuum reservoir (not shown) which is selectively connected to vacuum nipples 13 and 14.

The valve section 11 comprises first and second wafer-like sections 15 and 16 which are assembled to form a complete casing. The sections 15 and 16 are provided with principal walls 15a and 16a having partially tapered ends 15b and 16b to define hollow regions or chambers 17, 18 and 19. Chambers 17 and 18 are appropriately sealed to function as first and second vacuum chambers of the actuator system when the wafer-like sections 15 and 16 are assembled as shown in the figure. Assembly of the wafer-like sections occurs at a pair of flanges extending radially from the partially tapered end walls 15b and 16b. Flange 15c is planar while flange 16c has a planar portion terminating in a C-shaped clamp which receives and holds the planar flange 15c and the end portion of lower diaphragm 21 in an air-tight seal. Diaphragm 21 is a resilient member, preferably made of rubber, and provides a common wall between chambers 18 and 19 to form an air-tight pressure seal between the chambers. Above principal wall 15a and fastened thereto in an air-tight sealing relationship, are vacuum nipples 13 and 14 which are in communication with vacuum chambers 17 and 18. Nipple 14 has a passage 14a in direct communication with passage 22 of chamber 18, while nipple 13 communicates directly with chamber 17.

The first wafer-like section 15 has a C-shaped spacing member 22a attached to the inner face of wall 15a. The C-shaped member 22a is provided with passageway 22 communicating with passageway 14a leading directly to vacuum nipple 14. The upper face of the C-shaped member 22a holds the end portion of upper resilient diaphragm 20 in an air-tight sealing arrangement against the inner face of wall 15a. Diaphragm 20 forms a common wall between chambers 17 and 18 and forms an air-tight seal therebetween. The bottom portion of C-shaped member 22a contacts the upper face of diaphragm 21 so as to limit its effective area to one that is substantially equal to the effective area of diaphragm 20. If desired, the bottom portion of C-shaped member 22a may be fastened by appropriate means, such as glue, to diaphragm 21. As was mentioned previously, chamber 17 is in direct communication with vacuum nipple 13.

The two resilient diaphragms 20 and 21 are each provided with relatively rigid center members 22 and 23 which are integrally connected to the respective diaphragms in an air-tight sealing relationship. There is no direct passageway or connecting member between chambers 17 and 18. Above each rigid center member 22 and 23 of diaphragms 20 and 21, there is permanently attached, by suitable means, spacing members 24 and 25 with a portion of the respective diaphragms interposed between the respective rigid members and respective spacing members. An air-tight seal is formed between the respective diaphragms and their individual respective rigid members and spacing members.

Spacing member 24 is substantially in the shape of an inverted T having a center rod member 26 passing loosely through vacuum chamber 17 beyond wall 15a and into vacuum nipple 13. Rod member 26 has a retaining member 27 attached at a point inward from its end and immediately adjacent the outer face of wall 15a preventing the rod member 26, and the attached parts such as the inverted T-shaped spacing member 24 and diaphragm 20, from moving downward beyond the length of rod 26. However, the center rod member 26 and the attached parts thereof are free to move upwardly to the extent permitted by the arms of the inverted T-shaped member 24. Nipple 13 has sufficient interior space to accommodate rod 26 during the course of its limited movement. Thus, diaphragm 20, its center rigid member 22, and the inverted T-shaped member 24 can be displaced toward the inner face of wall 15a until the arms of the T-shaped member 24 contact the inner face of the wall 15a and prevent any further movement of the diaphragm assembly.

Surrounding the center rod member 26 and retained by the end portions of the arms of the inverted T-shaped member 24 is a pressure means, such as a spring 28 biased against wall 15a urging the diaphragm assembly downward.

Spacing member 25 is substantially a U-shaped rigid member having arms extending toward upper diaphragm 20. As was previously mentioned, it is integrally connected with diaphragm 21 and its rigid center member 23 to form an air-tight seal. The arm portions of U-shaped spacing member 25 retain a pressure means such as a spring 29, which is in direct contact with center rigid member 22 of diaphragm 20 and is biased between rigid member 22 and the U-shaped spacing member 25. Diaphragm 21 is movable in both upward and downward directions because of its resilient nature and lack of any permanent restraining means. However, the arms of the U-shaped member 25 limit the upward movement of diaphragm 21 when they contact rigid center member 22 of the diaphragm 20, the movement of which is resisted by spring 28. Spring 28 is somewhat stronger than spring 29 so that additional force, in the form of vacuum, is required to compress spring 28.

Chamber 19 is vented to atmosphere by opening 19a in the lower wall 16a, thus allowing atmospheric pressure to continuously act against diaphragm 21. Wall 16a also has a central communicating port 30 joining the actuator section 11 to the valve section 12. The upper portion of the valve section 12 is provided with an annular groove 31 to admit bead 32a of resilient connecting member 32, which seals chamber 19 from the common chamber 33 of valve section 12. The bead 32a is held within groove 31 by a portion of lower wall 16a surrounding port 30. The wall 16a is suitably permanently attached to the portion of valve section 12 containing the groove 31, thereby forming a fluid seal.

Valve section 12 has an inlet 34, allowing flow in the direction indicated by the arrow, and two outlets 35 and 36, respectively, also allowing flow in the direction indicated. A common chamber 33 interconnects the inlet 34 with the outlets 35 and 36 and provides a passageway for valve stem assembly 37. The common chamber 33 has annular flanges 38 and 39 forming valve seats. Flange 38 defines the valve seat controlling flow between inlet 34 and outlet 35 while flange 39 defines the valve seat controlling flow between inlet 34 and outlet 36.

Valve stem assembly 37 loosely fits in the common chamber 33 and passes through port 30 to be integrally connected with rigid center member 23 of diaphragm 21. The rigid center member 23 is substantially a T-shaped member having a hollowed center rod member 23a, and a planar top portion in contact with diaphragm 21. Guide rod 40 is pressure fitted into the hollowed center rod member 23a and into main valve stem 41, which also has a center hollowed-out portion 41a to form a substantially integral connection between rigid member 23 and stem 41. The bottom portion of resilient member 32 fits between the bottom portion of the T-shaped member 23 and the top portion of the main valve stem 41 to form the other end of the fluid seal between valve section 12 and actuator section 11.

Main valve stem 41 has a finger-like member 42 which extends from the bottom of the main valve stem 41 to a point just prior to the bottom of common chamber 33. Center finger member 42 freely passes through valve heads 43 and 44 and has a retaining member 47 permanently attached thereto adjacent the operative face of valve head 44. Valve heads 43 and 44 are preferably rubber and movable into sealing relationship with valve seats 38 and 39, respectively. The valve heads 43 and 44 are also selectively movable independent from one another toward their respective valve seats. Positioned between the valve heads 43 and 44 is a pressure means, such as a spring 45 urging the respective valve heads into working relationship with their respective valve seats. Spring 45 is generally under greater load than either spring 28 or 29, but under less load than the combined load forces of springs 28 and 29. Valve head 44 is a U-shaped member having a resilient working face, generally composed of rubber, loosely receiving main valve stem 41. Valve head 43 also has a resilient working face and is movable in respect to the main valve stem 40. O-ring seals 46 provide a fluid seal with the inner faces of U-shaped valve head 44 and the bottom portion of the sides of main valve stem 41. Common chamber 33 has a receiving member 48 at the bottom thereof, loosely receiving center finger 42 of main valve stem 41 and aligns main valve stem 41 in the aproximate center of common chamber 33.

Actuation of the valve members 43 and 44 is accomplished by the interaction of pressure means 28, 29 and 45 in conjunction with the amount or degree of vacuum in chambers 17 and 18. With substantially no vacuum (which is the operative position illustrated) applied to vacuum nipples 13 and 14, fluid is allowed to flow from inlet 34 past valve seat 38 and through outlet 35. The flow of fluid is permitted because the combination of forces resulting from springs 28 and 29 substantially overcome the resistance of spring 45, giving rise to a net downward force on the valve stem 41, opening valve seat 38 by pushing valve head 43 downward. More specifically, spring means 28 is biased against wall 15a and urges spacing member 24, together with diaphragm assembly 20 downward; of course, no counteracting force is present in chamber 17 as the vacuum head nipple 14 is substantially absent. Spring means 29 is biased against rigid member 22 of diaphragm 20 and urges spacing member 25 downward, again, no counter force is present in vacuum chamber 18 as nipple 14 is vented to atmosphere through an appropriate control (not shown). The combined forces of spring means 28 and 29 are communicated through rigid center member 23 of diaphragm 21 to valve stem 41 which is urged downward with sufficient force to overcome the resistance of spring 45, thereby allowing valve head 43 to separate from valve seat 38 and open the passage between inlet 34 and outlet 35. Spring 45 is biased against valve head 43 and urges valve head 44 into a more intimate sealing relationship with valve seat 39 to insure positive shut-off of fluid. Hydraulic pressure resulting from the flow of fluid will substantially reenforce the force developed by spring 45 to further insure a positive shut-off at valve seat 39. Generally, this no-vacuum position has been found best suited for a maximum heat requirement allowing maximum fluid to enter the heating core (not shown) of an automobile engine and through appropriate control units (not shown), heat the interior of the automobile.

When vacuum is applied to vacuum chamber 18 through nipple 14 and vacuum chamber 17 is vented to atmosphere, an upward force develops which is substantially equal to the product of the vacuum applied and the effective area of diaphragm 21. Of course, a downward force of substantially equal magnitude is also produced on diaphragm 20, however, due to retaining member 27 (which is integrally connected to diaphragm 20 by means of spacing member 24), diaphragm 20 cannot be displaced downward regardless of the amount of vacuum applied to vacuum chamber 18 or the pressure load of spring 28. As a result, diaphragm 20 must remain substantially planar while diaphragm 21 is forced to move upward to compensate for the vacuum in chamber 18. The upward force moving diaphragm 21 is sufficient to compress spring 29 and thereby allow spring 45 to expand to its original position. Spring 45 then urges valve head 43 into a sealing relationship with valve seat 38 thereby closing the inner connecting passage between inlet 34 and outlet 35. During this operation, valve head 44 remains in sealing relationship with valve seat 39 as spring 45 continues to be biased thereagainst.

Diaphragm 20 does not move upward because of the unbalance of forces acting on it. The total downward force is a combination of the forces developed by spring 28 pushing downward on diaphragm 20 and the vacuum force (which is present in vacuum chamber 18) pulling downward on resilient diaphragm 20. The total upward force is a combination of forces developed by compressed spring 29 pushing upward on rigid center member 22 and the vacuum force pulling upward on diaphragm 21, reinforcing the pressure on rigid member 22. The downward forces are greater since diaphragms 20 and 21 have substantially equal effective areas and spring 28 requires more force to compress it than does spring 29.

As spring 29 is compressed upwardly, resilient diaphragm 21 also moves upwardly until the U-shaped retaining member 25 contacts rigid center member 22 of diaphragm 20. This is the limit of the upward movement of diaphragm 21. Valve stem 41 also moves upward a proportional amount as it is integrally connected to U-shaped retaining member 25 through the rigid T-shaped member 23 of diaphragm 21. The upward movement of the valve stem 41 releases the pressure holding valve head 43 away from valve seat 38, allowing a fluid seal to be formed therebetween. As has already been explained, valve head 44 remains in a sealing relationship with valve seat 39, preventing fluid from flowing between inlet 33 and outlet 35. Generally, this vacuum-in-one-chamber only position has been found best suited for a maximum cooling requirement, as substantially no fluid is allowed to enter the heating core and the desired cooling effect can take place.

When a source of vacuum is applied to vacuum chambers 17 and 18 through their respective nipples 13 and 14, an overall upward force is developed opening the inner connecting passage between inlet 34 and outlet 36. After the flow of fluid has been shut-off by valve heads 43 and 44, contacting valve seats 38 and 39, as a result of vacuum in chamber 18 only, the application of vacuum to chamber 17 produces a force which overcomes the spring load of spring 28 and compresses it upward. The upward motion of spring 28 permits resilient diaphragm 20 to move upward to the extent allowed by the inverted T-shaped restraining member 24. The arms of restraining member 24 contact principal wall 15a of the actuator section 11 and prevents any further upward movement of restraining member 24. Central rigid member 22 is integrally connected to restraining member 24 and also moves upwardly.

Since U-shaped restraining member 25 is already in pressure contact with rigid member 22, it also moves even further upwardly taking with it diaphragm 21 and its rigid T-shaped center member 23. The main valve stem 41 is attached to T-shaped member 23 and moves with it as an integral part thereof. Main valve stem 41 also moves central finger member 42 upwardly, to which is attached lower restraining member 47. Restraining member 47 contacts lower valve head 44 and pulls it upward in response to the movement of the main valve stem 41, thereby opening the passage interconnecting inlet 34 and outlet 36. Of course, the opening of this inlet causes spring 45 to be compressed, urging valve head 43 into its more intimate sealing relationship with valve seat 38 and insuring positive shut-off of the interconnecting passage between inlet 34 and outlet 35. Generally, this valve position has been found best suited for medium heat requirements, allowing fluid to enter the heating core at a point where only half the core is functioning so that only a medium amount of heat is produced.

It will be realized that in accordance with the invention, there has been provided a double outlet single inlet car heater valve which is vacuum actuated and assembled as a single unit. A valve arrangement is provided permitting both outlets to be closed, or if desired, selectively opening either outlet. These functions are performed with a minimum of valve stem motion while sufficiently opening the outlets fully. The multi-positioned vacuum actuator is relatively simple in design and construction but provides the necessary driving force to operate the valve assembly using vacuum that may vary in intensity in the range of 5 to 25 inches of mercury without effecting valve performance.

I claim as my invention:

1. A car heater valve assembly comprising a valve actuator housing having a valve section and an actuator section thereof:
   a first, second and third chamber in sequential spaced relationship within said actuator section;
      said first and second chambers being vacuum chambers;
   a vacuum source means selectively connected to the vacuum chambers;
   a first movable diaphragm member forming a common wall between said first and second chambers;
   a second movable diaphragm member forming a common wall between said second and third chambers;
      said diaphragm members each having a rigid central member and a spring means urging said diaphragms away from each other at the central members thereof;
   an inverted substantially T-shaped spacing member integrally connected to said first diaphragm at its central member;
   a substantially U-shaped spacing member integrally connected to said second diaphragm at its central member;
      said T-shaped member having a center rod extending from said first diaphragm to outside said first chamber;
   a retaining means attached to said center rod of the inverted T-shaped member immediately outside said first chamber;
   a valve stem assembly integrally connected to said U-shaped member and extending from said actuator section to said valve section;
   a valve head having opposing sealing faces operatively connected to said valve stem assembly;
      said valve stem assembly extending beyond said valve head;
   a retaining means attached to said valve stem assembly immediately beyond said valve head;
   a means defining a chamber within said valve section, and means defining an inlet and two outlets within said chamber interconnected with said inlet and said outlets and surrounding said valve head;

said common passageway having means defining valve seats in working relationship with said valve head sealing faces;

said sealing faces having a spring biased therebetween urging said sealing faces against their respective valve seats.

2. A car heater valve assembly comprising: a valve actuator housing having a valve section and an actuator section thereof; a first and second vacuum chamber in spaced relationship within said actuator section, each of said vacuum chambers having a resilient diaphragm defining at least one common wall thereof; a spring means biased against at least one of said diaphragms and cooperable therewith; vacuum source means selectively connected to said vacuum chambers; means defining a chamber within said valve section; means defining an inlet and two outlets within said chamber and interconnected therewith; a valve means within said chamber in selectively sealing relationship with said inlet and outlets; and an actuator means interconnected between at least one of said vacuum chambers and said valve means responsive to pressure changes in at least one of said vacuum chambers for selectively opening and closing said inlet and outlets.

3. A car heater valve assembly according to claim 2 wherein the diaphragms have a substantially rigid center member and the spring means is biased against said diaphragms at said rigid center members spacing said diaphragms.

4. A car heater valve assembly according to claim 2 wherein said diaphragms have substantially equally effective areas.

5. A car heater valve assembly according to claim 2 including individual spacing means integrally connected to the diaphragms maintaining a separation therebetween.

6. A car heater valve assembly according to claim 5, wherein the spacing means integrally connected to the diaphragm of the first vacuum chamber has a rod member extending from said diaphragm to beyond said vacuum chamber and terminating at said second vacuum chamber, said rod member having a retaining means immediately outside said vacuum chamber.

7. A car heater valve assembly according to claim 2 wherein the diaphragm of the second vacuum chamber is integrally connected to the actuator means.

8. A car heater valve assembly according to claim 2 including an atmospheric pressure chamber within the actuator section in sequential relationship with the vacuum chambers.

References Cited

UNITED STATES PATENTS

| 3,063,469 | 11/1962 | Freeman | 137—625.5 X |
| 3,252,471 | 5/1966 | Olson | 137—627.5 X |
| 3,310,282 | 3/1967 | Boteler | 251—331 |

FOREIGN PATENTS

| 1,064,000 | 8/1959 | Germany. |
| 483,835 | 4/1938 | Great Britain. |

M. CARY NELSON, Primary Examiner

MICHAEL O. STURM, Assistant Examiner

U.S. Cl. X.R.

251—61.5